(12) United States Patent  
Schrüfer et al.

(10) Patent No.: US 8,523,186 B2
(45) Date of Patent: Sep. 3, 2013

(54) SLIDE RING SEAL ARRANGEMENT

(75) Inventors: Andreas Schrüfer, Wolfratshausen (DE); Manfred Oppler, Neufahrn (DE); Günther Lederer, Geretsried (DE); Armin Laxander, Gliching (DE); Klaus Lang, Beuerberg (DE); Rolf Johannes, Wolfratshausen (DE); Andreas Fesl, Otterfing (DE); Peter Dröscher, Geretsried (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 963 days.

(21) Appl. No.: 11/922,129

(22) PCT Filed: Jul. 6, 2006

(86) PCT No.: PCT/EP2006/006635
§ 371 (c)(1),
(2), (4) Date: Oct. 13, 2010

(87) PCT Pub. No.: WO2007/006493
PCT Pub. Date: Jan. 18, 2007

(65) Prior Publication Data
US 2011/0042903 A1 Feb. 24, 2011

(30) Foreign Application Priority Data
Jul. 14, 2005 (DE) .................... 20 2005 011 137 U

(51) Int. Cl.
*F16J 15/34* (2006.01)
(52) U.S. Cl.
USPC ............ 277/370; 277/377; 277/390; 277/397

(58) Field of Classification Search
USPC .......................... 277/377, 384, 390, 392, 397
See application file for complete search history.

(56) References Cited

U.S. PATENT DOCUMENTS

| 4,212,475 A | 7/1980 | Sedy | |
|---|---|---|---|
| 5,501,471 A * | 3/1996 | Ohba et al. | 277/379 |

(Continued)

FOREIGN PATENT DOCUMENTS

| DE | 295 18 119 U1 | 2/1996 |
|---|---|---|
| DE | 296 12 203 U1 | 10/1996 |

(Continued)

*Primary Examiner* — Vishal Patel
(74) *Attorney, Agent, or Firm* — Edwards Wildman Palmer LLP; Scott D. Wofsy

(57) ABSTRACT

A slide ring seal arrangement comprises a rotationally fixed slide ring (4) and a slide ring (11), which is provided for rotating together with a rotating component, these slide rings each being held in a loose seat and interacting, in, in essence, radially oriented sealing surfaces, which are prestressed with a main prestressing force while in contact with one another. Each slide ring, on its front face that faces away from the sealing surface, is axially supported on a supporting part (14, 17) via an annular bearing surface (16, 20) provided between the respective supporting part and the adjacent front face of the respective slide ring. A load ratio $(d_1^2 - d_H^2)/(d_1^2 - d_2^2)$ of $=2.0$, preferably between 0.8 and 2.0, preferably no greater than between 1.0 and 1.5, more preferably approximately 1.3 is maintained on the bearing surface (16, 20). The measurement $(d_1-d_2)$ of each bearing surface (16, 20) is equal to $=10$ mm, preferably between 0.2 and 2.0, preferably no more than approximately 0.6 mm.

5 Claims, 1 Drawing Sheet

(56) References Cited

U.S. PATENT DOCUMENTS

Figure 1:
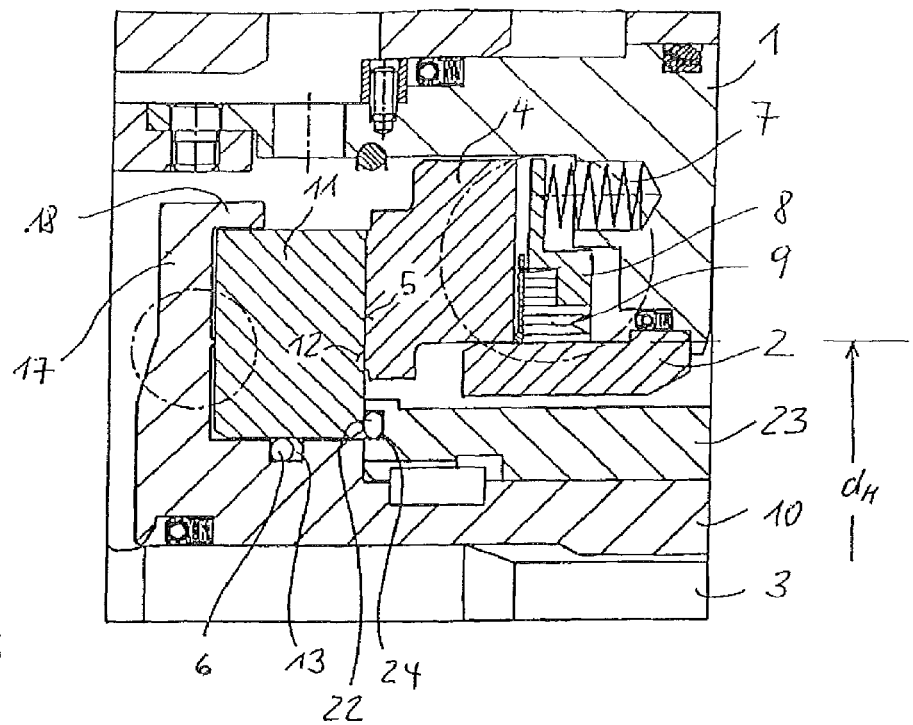

| | | |
|---|---|---|
| 5,529,317 A | 6/1996 | Muller |
| 6,213,472 B1 * | 4/2001 | Bondarenko et al. .......... 277/399 |
| 6,601,854 B2 * | 8/2003 | Auber ............................ 277/377 |
| 6,848,689 B2 * | 2/2005 | Auber ............................ 277/377 |
| 7,240,904 B2 * | 7/2007 | Droscher et al. ............... 277/349 |

FOREIGN PATENT DOCUMENTS

| | | |
|---|---|---|
| DE | 693 05 278 T2 | 2/1997 |
| DE | 202 17 983 U1 | 3/2003 |
| EP | 1 271 023 A2 | 1/2003 |
| FR | 2 495 727 A | 6/1982 |
| JP | 2004251376 A | 9/2004 |

* cited by examiner

SLIDE RING SEAL ARRANGEMENT

The invention relates to a slide ring seal arrangement and in particular to a gas-lubricated slide ring seal arrangement which has special advantages when used under high thermal and pressure loads.

In conventional slide ring seal arrangements (U.S. Pat. No. 4,212,475), the cooperating slide rings (hereinafter called "seal rings") are sealed and supported with respect to neighbouring components by means of secondary seal elements. The secondary seal elements are mostly O-rings or lip seal rings consisting of a flexible material. Since the seal rings are not in a pressure-relieved state when in operation, frictional forces, which can produce greater or lesser radial forces in dependence on the size of the prevailing supporting forces, can occur at those places whereat the seal rings are supported on the neighbouring components by the secondary seal elements due to relative movements caused by e.g. thermal expansion. In operation, these forces can exert a tilting moment on the seal ring concerned which is such as to alter the geometry of the seal gap to such an extent that premature wear of the seal rings and/or increased leakage can occur. This can lead at least to unwanted fluctuations in the operational behaviour of the slide ring seal arrangement. Furthermore, a slide ring seal arrangement of the type specified in the preamble of the main claim is known from EP 1271023 A, wherein the rotary seal ring is loosely seated and is supported in sealing manner on a supporting element consisting of a hard material having a similar pattern of thermal expansion as that of the material of the seal ring. It is stated that the radial forces and thus their effects on the geometry of a seal gap between the seal rings can be minimized by suitable dimensioning of the contact surface area ratio of the rotary seal ring on the supporting element. The stationary seal ring is supported on a seal housing in the conventional manner and is sealed against it by means of an O-ring.

The object of the invention is to provide an improved slide ring seal arrangement of the type mentioned hereinabove wherein adherence to a desired seal gap geometry is ensured. In particular, the harmful effect upon the geometry of the seal gap due to tilting moments induced by frictional forces when in operation is to be minimized.

This object is achieved by the features of claim 1. The invention represents an improvement and further development of the arrangement derivable from EP 1271023A. In contrast to that of the known arrangement, it is not only the rotary seal ring but also the stationary seal ring that is held in a loosely seated manner so that both seal rings possess a self-aligning property under the forces effective thereon. Moreover, both seal rings are supported on ring-shaped planar contact surfaces, whereby the contact pressures are not only precisely determinable beforehand but also minimized. There are no secondary sealing elements consisting of a flexible material involved at the points of support for the two seal rings and for the sealing thereof with respect to neighboring components of the slide ring seal arrangement. Rathermore, such elements can, in principle, be dispensed with since the contact surfaces themselves exercise a sealing function when axial forces are applied thereto corresponding to the dimensional rule in accord with the invention. The dimension $d_1-d_2$ of each contact surface should amount to $\leq 10$ mm, preferably to between 0.2 mm and 2.0 mm, and most preferably to about 0.6 mm. The contact surfaces can have a preferred approximately knife edge-like configuration. For the purpose of improving the sealing effect, a further development of the invention envisages that each contact surface be formed such as to be planar to a dimensional tolerance of $\leq 10$ µm in the circumference direction and $\leq 5$ µm in the radial direction. Hereby, it is preferred that a secondary bias force, which is independent of the particular operational state and with the aid of which the rotary seal ring is spring biased against its contact surface in addition to a main bias force prevailing between the two seal rings, should amount to between 0.2 N per mm and 10 N per mm of peripheral length at the end face position of the rotary seal ring at which the secondary spring bias force is applied. This also ensures that there will be an adequate sealing effect at this contact surface even when the arrangement is stopped and hydraulic operating pressures are low. Reference is made to the claims in regard to other embodiments of the invention.

Figure 2:
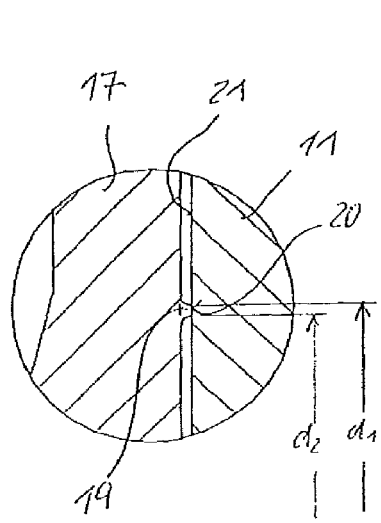
Figure 3:
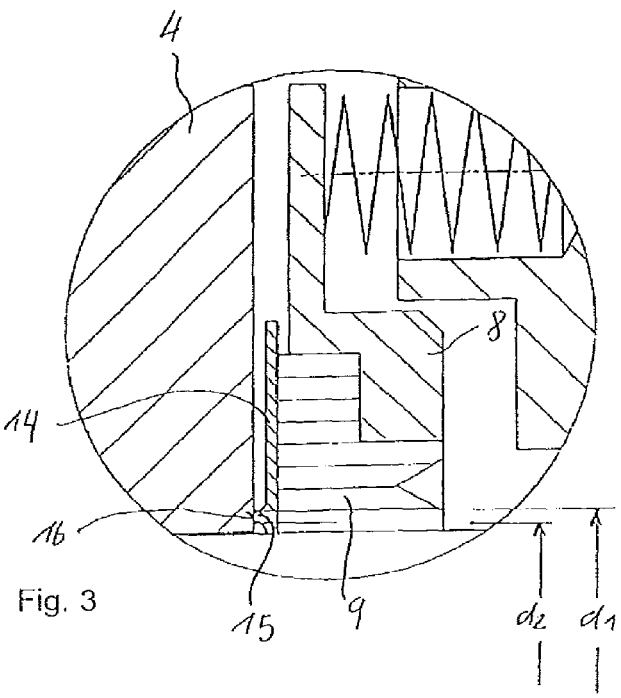

The invention is described in more detail hereinafter with the aid of an embodiment and the drawing. Therein:

FIG. 1 is a partial longitudinal sectional view of a slide ring seal arrangement in accordance with the invention after installation in an equipment requiring sealing, FIG. 2 is an enlarged view of a first detail of the slide ring seal arrangement shown in FIG. 1, and FIG. 3 is an enlarged view of a second detail of the slide ring seal arrangement shown in FIG. 1.

FIG. 1 shows the slide ring seal arrangement of the invention in the form of a sectional view along the upper half thereof taken with respect to the central longitudinal axis. The reference symbol 1 relates to a seal housing which can be arranged in a bore of the housing of an equipment (shown only fragmentarily in the drawing) e.g. a compressor, and fixed therein in a suitable manner. A shaft 3 is fed through the bore of the housing. A stationary seal ring 4 is arranged in axially moveable manner on a sleeve-shaped support 2 in the seal housing 1, said support projecting axially from the seal housing 1 and being either integral therewith or in the form of a separate part that is mounted thereon in sealing manner.

A sealing surface 5 is formed at an end face of the stationary seal ring 4. The seal ring 4 is secured from rotating relative to the seal housing 1. For this purpose, a (not shown) drive pin projecting axially from the seal housing 1 at a peripheral position that is not shown in the drawing can engage in a (likewise not shown) aligned recess provided in the stationary seal ring 4 with a certain amount of play. Basically, the stationary seal ring 4 is thus prevented from rotating relative to the seal housing 1, but it does remain freely moveable within the range of free play however, so that it can align itself in the axial and radial directions. In consequence, the stationary seal ring 4 is held on the seal housing 1 in loosely seated manner.

A main biasing means, e.g. in the form of a main bias spring 7 that is supported at one end on the seal housing 1 is provided in order to subject the stationary seal ring 4 to a certain main bias force. Several peripherally distributed main bias springs 7 could be provided. The invention is not however restricted to the biasing means depicted.

As is illustrated in the drawing, the other end of the main bias spring 7 is supported on a force transmitting ring 8 which is seated in axially moveable manner on the support 2 and carries along the inner periphery thereof a seal 9 consisting of a flexible material, such as rubber, an elastomer or a carbon material, which is in sealing relationship with the outer periphery of the support 2. A support ring 14 which is likewise seated in axially moveable manner on the sleeve-shaped support 2 rests on a portion of the secondary seal 9 that protrudes axially from the force transmitting ring 8 to a certain extent at least in the unloaded state. The support ring may preferably be an annular disc consisting of a material having similar thermal expansion properties to those of the seal ring 4.

Projecting axially from the free end face of the support ring 14 remote from the force transmitting ring 8, there is a ring shaped projection 15 which creates a ring-shaped contact surface 16 in a radial plane as shown in FIG. 3. The end face of the stationary seal ring 4 remote from the sealing surface 5 rests against the contact surface 16 and is axially supported thereby. The main bias force of the bias spring 7 is simultaneously transferred to the stationary seal ring 4 in this way.

A rotary seal ring 11 is seated in loosely seated manner on a bushing 10 which is connected in an appropriate way to the shaft 3 such as to be non-rotational relative thereto. The seal ring 11 has a sealing surface 12 on one end face thereof which is intended to cooperate with the sealing surface 5 of the stationary seal ring 4. In a groove 13 in the outer periphery of the bushing 10, there is arranged a driver ring 6 which is in frictional engagement with the inner periphery of the of the seal ring 11 in order to create a torque transferring relationship between the bushing 10 and the seal ring 11 which is such that the seal ring 11 is caused to rotate by the rotation of the bushing 10 on the one hand, whilst the freedom of movement of the seal ring 11 created by its loosely sealed state is not adversely affected thereby or is only affected to an insignificant extent on the other. The driver ring 6 may be an O-ring consisting of a rubbery elastic material, although no sealing effect or only a negligibly small one need be attributable thereto. In place of an O-ring, a ring-shaped spiral spring element having a sloping winding could also be provided. Such spiral spring elements are basically known to the skilled person and consequently do not need to be described in more detail.

Furthermore, the drive ring 6 exerts a centering effect on the seal ring 11. The invention is not restricted to the previously described type of arrangement for the transmission of torque from the busing 10 to the seal ring 11. Rathermore, provision could also be made for different means to take over this function. Preferably, the rotary seal ring 11 has a rectangular cross sectional configuration.

Projecting radially outwardly from the bushing 10, there is a flange or supporting part 17 upon the outer periphery whereof there can be formed a collar or a screen 18 which extends at least partly over the outer periphery of the seal ring 11 and can shield it from harmful environmental effects. Sufficient play is provided between the neighbouring wall portions of the seal ring 11 on the one hand and the supporting piece 17 and the screen 18 on the other so that the freedom of movement of the seal ring 11 within a suitable free play tolerance range is not reduced.

As is shown in FIG. 2 projecting axially from the supporting piece 17 there is a ring-shaped projection 19 which has a ring-shaped contact surface 20 in a radial plane in a similar manner to the ring-shaped contact surface 16 on the projection 15. The end face 21 of the rotary seal ring 11 remote from the sealing surface 12 rests on the contact surface 20 and is axially supported thereby and sealed with respect to the supporting piece 17.

In operation, a seal gap, which holds the sealing surfaces 5, 12 apart and out of contact, is formed between the mutually facing, substantially radially aligned sealing surfaces 5, 12 of the seal rings 4, 11. By contrast, when the shaft 3 is stopped, the sealing surfaces 5, 12 are pressed into sealing engagement with one another by the main bias force of the bias spring 7. Preferably pumping structures are formed in at least one of the sealing surfaces 5, 12 in order to pump a gaseous medium requiring sealing between the sealing surfaces 5, 12 and thereby assist in the formation of the seal gap. Pumping structures of this type are known to the skilled person and do not need to be described in more detail here. Reference can be made to e.g. BURGMANN, Gasgeschmierte Gleitringdichtungen, Self-published, 1988, pages 16 et seq.

The preferred materials for the seal rings 4, 11 are hard materials such as tungsten carbide, silicon carbide, silicon nitrite, as well as tribologically effective materials such as carbon material, each in suitable pairings.

Due to the different thermal expansions and other factors such as mechanical loads, radially aligned forces or such having radial components may be effective on the seal rings 4, 11 in operation e.g. due to frictional effects, and these forces can lead to tilting of one or both of the seal rings 4, 11 in the clockwise direction or in an anticlockwise direction and thus to an alteration in the geometry of the seal gap between the sealing surfaces 5, 12.

It has been found that these radial forces can be minimized if a load ratio $(d_1^2-d_H^{2)/(}d_1^2-d_2^2) \leq 2.0$, preferably between 0.8 and 2.0, most preferably between 1.0 and 1.5 and far preferably about 1.3 is kept on both contact surfaces 16, 20. The meanings in this relationship are: $d_1$=the external diameter of the r contact surface 16 or 20, $d_2$=the internal diameter of the contact surface 16 or 20, $d_H$=the diameter of the hydraulically effective surface area of the pair of seal rings which is subjected to the pressure of the medium requiring sealing. The hydraulic pressure exerted on the effective surface area produces a force which is superimposed on the prevailing bias forces by means of which the seal rings 4, 11 rest against the contact surfaces 16, 20 concerned. In the event of a relative movement between the seal ring concerned and the contact surface, this force can exert a radial component with the aforementioned harmful effect.

Furthermore, according to the invention, the dimensions of the two contact surfaces 16, 20 are limited to a size $(d_1-d_2) \leq 10$ mm, preferably between 0.2 and 2.0, most preferably about 0.6 mm, so that the contact surfaces can have an approximately knife edge-like character.

If the above-mentioned conditions are adhered to, it is ensured on the one hand that the resulting force is sufficiently large to produce a reliable sealing relationship between the seal rings 4, 11 and the contact surfaces 16, 20 so that leakage along the contact surfaces is prevented or at least held to a minimum small amount. In consequence, they can take over the function of a secondary seal. The sealing relationship is improved still further if each ring-shaped contact surface 16, 20 is planar with a dimensional tolerance of $\leq 10$ μm in the circumferential direction and $\leq 5$ μm in the radial direction. On the other hand, the radial forces on the contact surfaces 16, 20 occurring as a consequence of e.g. different radial thermal expansions must not be so large that a tilting moment exerted thereby on the seal rings 4, 11 can lead to an inadmissible deviation from the ideal parallel alignment of the sealing surfaces 5, 12 when in operation. For example, a tilting moment on the rotary seal ring 11 that is directed in a clockwise direction in the drawing by a radial force directed radially outwardly could lead to the formation of a seal gap between the sealing surfaces 5, 12 having an A-shaped cross section, whilst a tilting moment in an anticlockwise direction would result in the formation of a V-gap. Similar consequences would entail in the case of corresponding tilting moments on the part of the stationary seal ring 4. Each deviation from the ideal parallel gap configuration generally results in increased wear of the sealing surfaces 5, 12 and uncontrolled leakage along the seal gap. The effect is achieved by means of the invention that the formation of a V- or an A-gap is completely prevented or is prevented at least insofar as possible so that a restriction in the life span and/or impairment of the operational reliability of the slide ring seal arrangement caused thereby is avoided.

A further consequence of the above-mentioned design of the contact surfaces 16, 20 is that they come to lie at virtually the same radial distance from the central longitudinal axis of the slide ring seal arrangement, this, to a large extent, thereby enabling a corresponding moment-free transmission of the axial forces from one contact surface 16 to the other contact surface 20.

Furthermore, as is shown in the drawing, a secondary bias element 24 can be accommodated in an annular groove 22 in the end face of a sleeve 23 seated on the bushing 10 for rotation in common therewith, whereby said element may preferably be a ring-shaped spiral spring element having sloping turns to which reference has already been made hereinbefore The secondary bias element 24 is peripherally supported on the neighbouring end face of the rotary seal ring 11 and subjects it to a certain axial secondary bias force independently of the main bias spring 7.

In the context of the invention, it has been established that the secondary bias force should amount to between approximately 0.2 and 10 N/mm of the peripheral length of the peripheral position at which the secondary bias element 24 is supported on the rotary seal ring 11. This creates an improved sealing relationship between the contact surface 20 and the adjacent end face of the rotary seal ring 11 when the slide ring seal arrangement is at a standstill.

The invention was described hereinabove on the basis of an embodiment wherein the contact surfaces are provided on projections of the supporting parts concerned. It should be understood however that the contact surfaces could also be formed on the seal rings themselves if so desired. Moreover, the ratios on the rotary and stationary seal ring could be different. The projections may represent either an integral component of the supporting part or the seal ring concerned, or, they may be extra parts which are subsequently fixed thereto in an appropriate manner (see, for example, FIG. 1 wherein the projections 15 and 19 are depicted as being formed integrally with their associated supporting elements and FIG. 2 wherein the projection 19 is illustratively shown as a separate part affixed to the supporting part 17). The use of extra parts enables them to be formed in preferable manner from wear resistant materials of the aforementioned type. Although the invention offers special advantages in its use for a gas-lubricated slide ring seal arrangement, it could also be employed with liquid-lubricated arrangements in order to at least minimize or even exclude the possibility of a given seal gap geometry being subjected to thermally induced distortions. The main biasing means could be effective on the rotary seal ring rather than on the stationary one, so that it would then have to be located in axially displaceable manner on the rotary component.

The invention claimed is:

1. A slide ring seal arrangement comprising a non-rotatable slide ring and a slide ring provided for rotation in common with a rotatable component, said slide rings being held in a loosely restrained manner and comprising co-operating, substantially radially aligned sealing surfaces biased into engagement with one another by a main biasing force, wherein each slide ring is axially supported at a side thereof facing away from its sealing surface, by a corresponding support component of a pair of support components, one of said support components being provided for rotation in common with said rotatable component and the other of said support components being non-rotatable, via an annular contact surface, said annular contact surfaces being provided respectively between a respective one of said support components and an adjacent side of one of said slide rings that faces away from the sealing surface of thereof, wherein a load ratio $(d_1^2-d_H^2)/(d_1^2-d_2^2)$ of each contact surface is about 1.3 wherein the dimension $(d_1-d_2)$ of each contact surface is about 0.6 mm, and wherein:

$d_1$=an outer diameter of each of said contact surfaces,
$d_2$=an internal diameter of each of said contact surfaces, and
$d_H$=a diameter of a hydraulically effective surface area of said pair of slide rings that is subjected to a sealing pressure.

2. The slide ring seal arrangement according to claim 1, wherein each of said contact surfaces is planar within a dimensional tolerance of $\leq 10$ μm in the circumferential direction and $\leq 5$ μm in the radial direction.

3. The slide ring seal arrangement according to claim 1, wherein at least one of said contact surfaces is provided on a projection protruding axially from a side of a slide ring facing away from the sealing surface thereof.

4. The slide ring seal arrangement according to claim 1 wherein at least one of the contact surfaces is provided on a projection protruding axially from a support component toward a side of an adjacent slide ring that faces away from the sealing surface thereof.

5. The slide seal arrangement according to claim 1, wherein a secondary bias force, with which the slide ring provided for rotation is additionally biased against an adjacent contact surface, amounts to between 0.2 N per mm and 10 N per mm circumference of a circumferential contact portion of a secondary biasing member with the slide ring provided for rotation.

* * * * *